United States Patent [19]

Richards

[11] Patent Number: 5,043,907
[45] Date of Patent: Aug. 27, 1991

[54] BAND SAW APPARATUS AND METHOD WITH FIRST CUT INPUT TO CONTROLLER

[75] Inventor: Mark P. Richards, Chouteau, Okla.

[73] Assignee: Hem, Inc., Pryor, Okla.

[21] Appl. No.: 522,161

[22] Filed: May 11, 1990

[51] Int. Cl.⁵ .................. B23D 53/04; B26D 1/46
[52] U.S. Cl. .................. 364/474.090; 83/33; 83/76.7; 83/76.9; 83/789; 83/796; 83/800
[58] Field of Search .............. 83/74, 75, 76, 72, 76.7, 83/76.8, 33, 371, 789, 796, 76.1, 76.6, 76.9, 800, 756; 364/474.09

[56] References Cited

U.S. PATENT DOCUMENTS

| | | | |
|---|---|---|---|
| 3,575,074 | 4/1971 | Aizawa | 83/796 |
| 4,016,787 | 4/1977 | Sugimoto | 83/72 X |
| 4,170,915 | 10/1979 | Sato | 83/76 X |
| 4,432,260 | 2/1984 | Saurai et al. | 83/13 |
| 4,437,367 | 3/1984 | Hauser | 83/13 |
| 4,481,845 | 11/1984 | Sakurai et al. | 83/72 X |
| 4,481,849 | 11/1984 | Aoyagi | 83/796 |
| 4,534,247 | 8/1985 | Taguchi | 83/789 X |
| 4,557,168 | 12/1985 | Tokiwa | 83/72 X |
| 4,700,597 | 10/1987 | Taguchi | 83/72 X |
| 4,805,500 | 2/1989 | Saito et al. | 83/796 X |
| 4,901,612 | 2/1990 | Harris | 83/56 |

*Primary Examiner*—Frank T. Yost
*Assistant Examiner*—Kenneth E. Peterson
*Attorney, Agent, or Firm*—Flehr, Hohbach, Test, Albritton & Herbert

[57] ABSTRACT

A band saw having a controller responsive to sensing signals as to operating parameters of the saw to generate a material distribution profile during a first cut of a piece of bar stock is disclosed. During subsequent cuts, the controller for the band saw operates control circuits for blade cutting force, blade feed rate and blade speed to maintain a desired, usually constant, material cutting rate of the bar stock, notwithstanding changes in bar stock cross section and changes in band saw geometry during the cut. A method is disclosed in which operating parameters are sensed, a distribution profile generated, and the profile employed during subsequent cuts to control the operating parameters for optimum cutting efficiency.

30 Claims, 2 Drawing Sheets

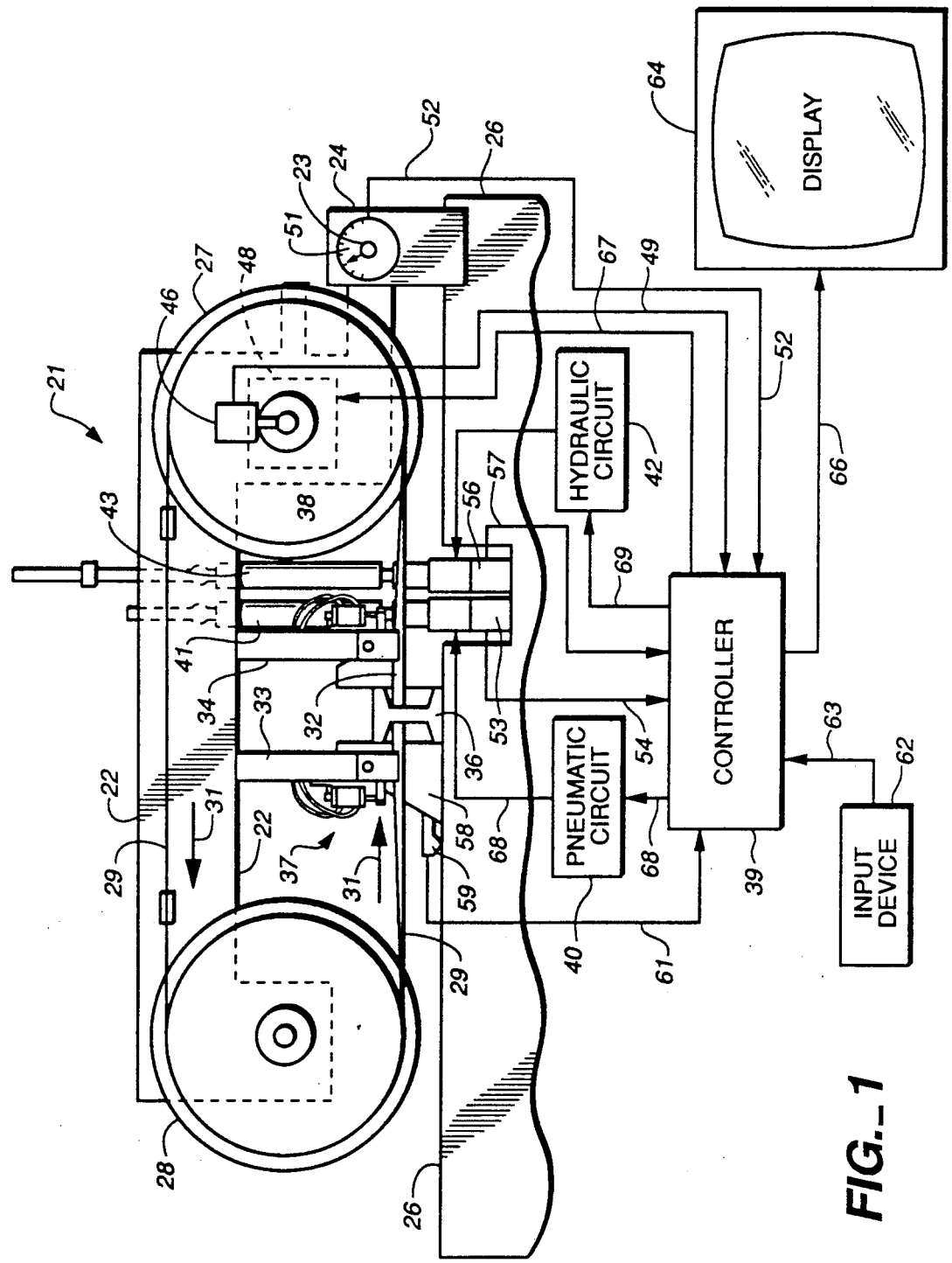
FIG._1

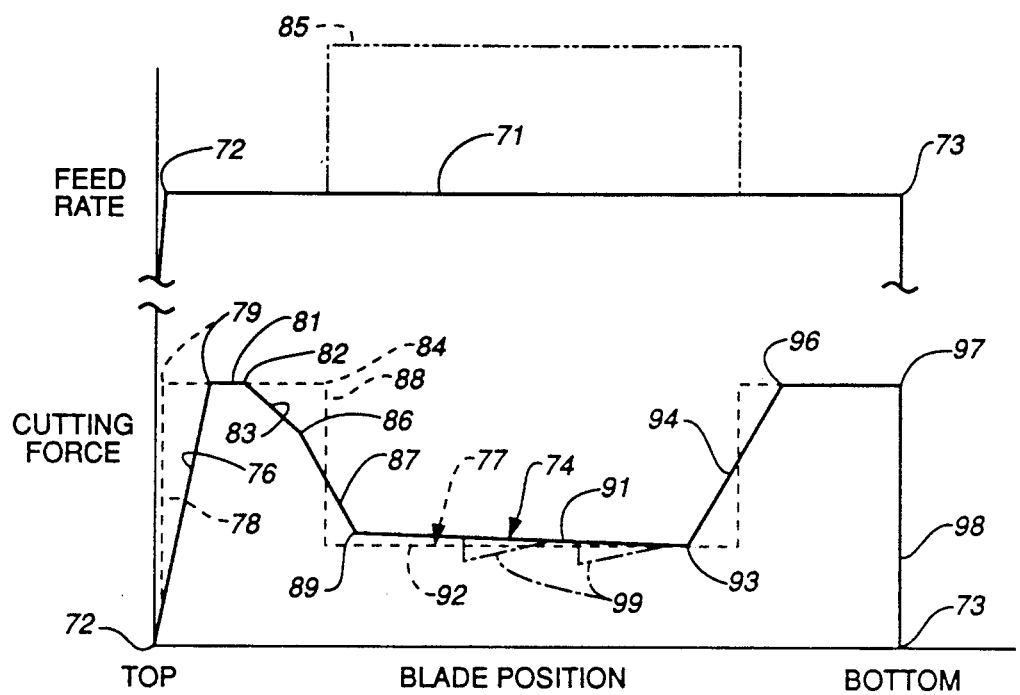
FIG._2
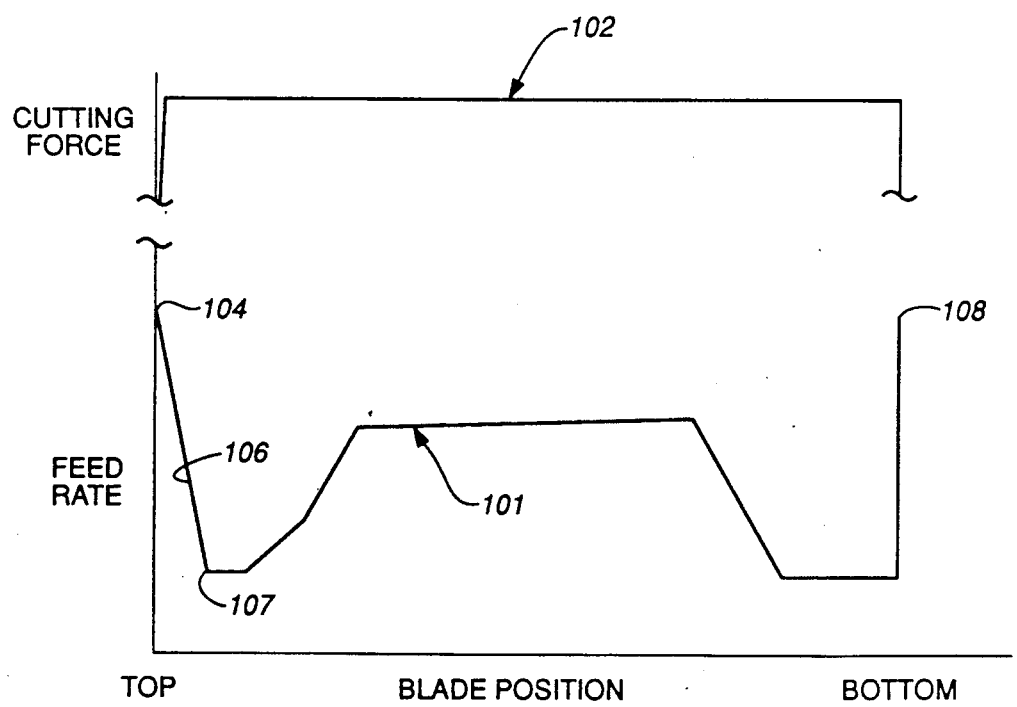
FIG._3

BAND SAW APPARATUS AND METHOD WITH FIRST CUT INPUT TO CONTROLLER

TECHNICAL FIELD

The present invention relates, in general, to band saw apparatus for production cutting of bar stock, and more particularly, relates to a band saw apparatus and method for cutting bar stock in which the material cutting rate is attempted to be maintained at a constant value notwithstanding changes in bar stock cross section.

BACKGROUND ART

Considerable effort has been directed at enhancing the cutting efficiency of band saws, particularly when cutting hard metallic workpieces in production cutting applications. As the material becomes relatively hard and the number of pieces to be cut increases, the importance of operating the band saw in a manner which is highly efficient increases dramatically.

Modern production band saw controls have become quite sophisticated. In U.S. Pat. No. 4,901,612 to Harris, for example, control of the blade cutting force on the workpiece independently of the feed rate is disclosed. This control system allows the user to set a maximum cutting blade force that can be achieved below a force which will endanger the blade and then to independently set the feed rate.

When a band saw of the type disclosed in Harris U.S. Pat. No. 4,901,612 is used to cut a workpiece or bar stock having a non-rectangular cross-section, setting the blade cutting force at a constant value will automatically cause the blade feed rate to vary so as to accommodate changes in the length of the bar stock cross section. It is well known, therefore, to use a constant force controller as a means of accommodating variable workpiece cross section so as to achieve efficient cutting.

There are phenomenon, however, which will cause a constant force controlling of a band saw to produce changes in the feed rate which are not proportional to changes in the length of the cross section being cut. Thus, blade dulling will cause the workpiece to appear to have a longer cross section which requires slowing down of the feed rate. In fact, however, as the blade dulls, the feed rate needs to be increased in order to maintain the same cutting rate for the material.

Similarly, as the material becomes harder, low feed rates tend to produce work hardening of the material being cut, rather than cutting. Again, the constant cutting force controlled saw will slow down as the material work hardens and gives the appearance of cutting a longer cross sectional length. Instead, the feed rate needs to be increased, or the force increased, if work hardening occurs.

One approach to overcoming the inefficiencies which can result from merely using a constant force to control cutting is to input information as to the cross-sectional shape of the workpiece and through computer control force the saw to cut at a constant cutting rate for the shape of the workpiece. In U.S. Pat. No. 4,437,367 to Hauser, for example, a computer/controller is input with a selected one of a plurality of typical cross sectional shapes for bar stock. The controller also is input with the type of bar stock material. The controller then calculates a theoretical feed force as a function of blade position and thus workpiece cross sectional length. This theoretical feed force is then compared against an actual, sensed feed force, and the computer controls the feed force during operation to match the theoretical value for the cross section involved.

Similarly in U.S. Pat. No. 4,432,260 to Sarurai, et al., sensors are used to measure the height and width of the piece of bar stock. The computer/controller for the band saw is then input with data as to the material being cut and the shape or cross section of the bar stock. Stored in the memory of the computer/controller are cutting rates for various materials. Accordingly, the computer/controller calculates a theoretical feed rate for the various cross sectional positions as the blade cuts through the bar stocks so as to maintain the material cutting rate at about the theoretical desired value. Controlling in this fashion allows the controller to maintain higher feed rates even though the blade may be dulling or the workpiece may be experiencing some work hardening.

The problem presented by approaches such as that of the Hauser and Sarurai, et al. patents is that bar stock does not always come in simple geometric cross sections. Even shapes which are relatively simple, such as I-beams and H-beams, have sloping flanges and webs which make input to the controller as to shape only an approximation. For complex cross sections, the shape input usually has to be a rectangular or other simplified approximation. Moreover, while highly skilled operators can make adjustments and good approximations, production sawing is often being undertaken now by personnel who are not journeymen machinists or metal cutters.

Accordingly, it is an object of the present invention to provide a band saw apparatus and cutting method which is particularly well suited for highly efficient production cutting of metal bar stock by relatively unskilled operators.

Another object of the present invention is to provide a band saw and production cutting method which is capable of cutting material at a substantially constant material cutting rate for bar stock of virtually any cross section shape.

Still another object of the present invention is to provide a method of cutting workpieces from bar stock of substantially uniform cross section which does not require operator input as to the bar stock shape or cutting cross sectional length.

Another object of the present invention is to provide a band saw suitable for production cutting of a plurality of pieces from bar stock of substantially uniform cross section with minimal operator input.

Still a further object of the present invention is to provide a method and apparatus for production cutting of bar stock with a band saw which is more economical, requires minimum training and supervision of operators, and can be retro-fit to control most existing band saws.

The band saw cutting method and band saw apparatus of the present invention have other objects and features of advantage which will become apparent from, and are set forth in more detail in, the accompanying drawing and following description of the best mode of carrying out the invention.

DISCLOSURE OF INVENTION

The method of cutting workpieces from bar stock of substantially uniform cross section of the present invention is comprised, briefly, of the steps of sensing operating parameters of the band saw during a first cut of the bar stock, generating a material distribution profile for the bar stock using the sensed parameters, and employing the profile to control operating parameters of the band saw during a subsequent cut of the bar stock. Preferably, one of blade feed rate, blade cutting force and blade speed are sensed as a function of blade position during the first cut, and that data, together with input data as to the material, is used to maintain the material cutting rate of the bar stock substantially constant throughout the subsequent cuts.

The band saw apparatus of the present invention includes a movable blade assembly, a controller coupled to control at least one of the blade feed rate and blade cutting force, sensing assemblies producing sensing signals as to blade position and at least one of blade feed rate, cutting force and cutting speed and input means coupled to input signals to the controller. The improvement in the band saw of the present invention comprises, briefly, the controller means being responsive to sensed signals and input signals during the first cut of the bar stock to generate a material distribution profile for the bar stock and to store the profile and data storage unit, and the controller further being responsive to sensed signals during a second cut to compare the same against the profile and to control at least one of the blade feed rate, blade cutting force and blade speed as a result of such comparison to produce a substantially constant material cutting rate during a second cut.

BRIEF DESCRIPTION OF THE DRAWING

FIG. 1 is a schematic, side elevation view of a band saw constructed in accordance with the present invention.

FIG. 2 is a graphical representation of a material distribution profile generated using the band saw apparatus and a constant blade feed rate.

FIG. 3 is a graphical representation of a material distribution profile generated using the band saw of the present invention and a constant blade cutting force.

BEST MODE OF CARRYING OF THE INVENTION

The band saw apparatus and method of the present invention essentially employ a training effect on the first cut of a piece of bar stock to enable subsequent cuts to be made at maximum efficiency. FIG. 1 illustrates a pivotal arm band saw, but it will be understood that the apparatus and method of the present invention also can be used with other forms of horizontal and vertical band saws. As will be explained in more detail hereinafter, however, the method of the present invention is particularly helpful in increasing the efficiency of cutting of the pivotal arm band saw.

As shown in FIG. 1, a pivotal arm band saw, generally designated 21, includes a horizontally extending arm or frame 22 which is pivotally mounted at 23 to a mounting bracket 24 extending upwardly from and secured to saw base 26. Rotatably mounted proximate opposite ends of arm 22 are a drive wheel 27 and an idler wheel 28. An endless band saw blade 29 is mounted on the drive and idler wheels for movement in the direction indicated by arrows 31. Slidably engaging blade 29 to rotate the blade by 90° and hold the same in a cutting stretch 32 are blade guide assemblies 33 and 34. Assemblies 33 and 34 are carried by arm 22, and one or both of the assemblies can be mounted for displacement along arm 22 so as to position the guides in close proximity to the sides of the bar stock or workpiece 36 being cut by cutting stretch 32.

In order to enhance cutting, it is preferable that the band saw further include blade tilting assemblies 37 and 38, which are controlled by control means or controller 39, to periodically tilt cutting stretch 32 at the guide assemblies for enhanced cutting efficiency. Additionally, it is preferable that band saw 21 include a blade cutting force control means, such as a cylinder 41, which is coupled to pneumatic circuit 40 and controlled by controller 39. In the most preferred form, saw 21 also includes blade feed rate control means, such as orifice control hydraulic cylinder 43, which is coupled to hydraulic circuit 42 and controlled by controller 39.

The details of construction, connection to controller 39 and operation of suitable cutting enhancers 37 and 38, as well as blade force control cylinder 41, pneumatic circuit 40, blade feed control cylinder 43 and hydraulic circuit 42 are set forth in U.S. Pat. No. 4,901,612, and they will not be repeated herein. As will become apparent hereinafter, however, the band saw apparatus and method of the present invention are suitable for use with band saws having only force control or only feed rate control systems which have much more limited capability than the control capability of the band saw in U.S. Pat. No. 4,901,612. It is not necessary to the present invention that the band saw have a blade tilting capability, or that the tilting capability be the same as that set forth in U.S. Pat. No. 4,901,612. If a band saw has either a force control circuit or a feed rate control circuit, it will benefit from using the method and apparatus of the present invention. The more sophisticated force and feed control systems afford the user more options in terms of saw operation, which will allow it to accommodate a wide variety of sawing conditions. Similarly, band saws which do not have cutting enhancers will benefit from the apparatus and method of the present invention. The presence of a cutting enhancer increases cutting efficiency, but it also makes the approximations of bar stock cross-sectional length which are found in the prior art even less accurate. The apparatus and method of the present invention provides benefits which are even greater if the band saw does have a blade tilting cutting enhancer, since each tilt of the saw blade changes the cross-sectional length being cut.

Band saw 21 further includes various sensing means producing sensing signals which are communicated to controller 29. Thus, the speed of blade 29 can be sensed by a tachometer 46 coupled to sense the speed of shaft 47 or of saw motor 48. Tachometer 46 communicates sensing signals as to the shaft's speed through conductor means or communication path 49. The angular position of saw arm 22 can be sensed by an angular transducer 51, such as an optical encoder, which communicates sensing signals to controller 39 through conductor means or path 52. Additionally, the force supporting arm assembly 22, an accordingly the net force of blade stretch 32 on workpiece 36, can be sensed by a pressure transducer 53 which is coupled to sense the pressure in the force cylinder 41 and communicates sensing signals through conductor means or pathway 54 to controller 39. Alternatively, transducer 53 could be coupled to pneumatic circuit 40 for the arm support cylinder 41. Similarly, transducer 56 is coupled to sense the pressure in cylinder 43 and communicates through conductor means or path 57 to the controller. Transducer 56 also could be integrated into the hydraulic circuit 42.

Finally, the position of movable vise jaw 58 is sensed by transducer 59, which communicates with controller 39 through conductor means 61.

Band saw 21 also includes a user input device 62, such as a keyboard and/or optical scanner, which is coupled for a transmission of input signals to controller 39 through conductor means 63. Optionally, the saw of the present invention also includes a display device, such as a video display or liquid crystal display 64, coupled by conductor means 66 for driving by controller 39.

As will be apparent, therefore, the band saw of the present invention includes means for controlling and sensing various operating parameters of the saw, including blade speed, blade cutting force and blade feed rate. All of these operations and sensing functions preferably are controlled by control means or controller 39, which advantageously can take the form of a digital computer.

As thus far described, however, the band saw of the present invention has components found in prior art band saws. In saws such as those set forth in U.S. Pat. No. 4,437,367 to Hauser and U.S. Pat. No. 4,432,260 to Sarurai, et al., an input device, such as input device 62, is used to input signals indicating the approximate cross section of workpiece 36. Bar stock member 36 has an H-beam cross section of substantially uniform thickness along its length, with the bar stock laid on one side or leg of the "H". As can be seen in FIG. 1, however, workpiece 36 even the H-beam has a shape which is sufficiently complex so as to make user input as to the cross section only an approximation. For example, both legs of the "H" slope toward the central web section. Additionally, when pivotal arm band saws are employed, the pivoting of the arm results in cutting of the cross section at various angles from horizontal. The effect of the changing pivot angle is to change the length of the workpiece engaged by the saw blade from a theoretical length base upon a horizontal cutting assumption to an actual length which is dependent on the blade angle to the horizon. It is possible, of course, to program the computer to account for this angular change, but that makes retro-fitting to individual saws a significant programming problem.

Still further, when an enhancer is employed which is based upon tilting the saw blade, such as cutting enhancers 37 and 38, one of the principles upon which such enhancers work is to periodically shorten the cross sectional length being engaged by the blade. Thus, the blade is see-sawed down through the work, with each angular change resulting in a temporary shortening of the length engaged by the saw blade. Again, it is possible to attempt to program for this effect, but such programming will depend upon the rate of tilting, which can vary substantially and makes programming quite complex.

In order to overcome these problems, as well as the problems of blade dulling and work hardening, therefore, the saw of the present invention employs apparatus and a method which in effect teaches the saw the exact material distribution profile of the workpiece under the actual operating conditions during a first cut. Once the first cut is complete, controller 39 can generate a very exact material distribution profile for the bar stock so that the saw's operating parameters on subsequent cuts can be controlled to maximize efficiency, for example, by maintaining a constant material cutting rate throughout the cut by varying at least one of blade speed, blade force or blade feed rate.

In FIG. 2 a graphic representation of a material distribution profile generated using the band saw of FIG. 1 can be seen, and the method of the present invention can be described. Broadly, the first step in the method of the present invention is comprised of sensing operating parameters of the band saw during a first cut of bar stock 36. But, even before operation of the saw, the bar stock parameters are sensed or input through input device 62. Thus, the width of the bar stock can be sensed by sensor 59 when movable jaw 58 closes against bar stock 36. The height of the bar stock can be sensed when the saw blade is lowered into engagement with the uppermost surface of the bar stock. At that point, both the feed rate and force transducers 53 and 56, respectively, will sense or "see" blade entry into the top of bar stock 36. Transducer 51 will indicate the saw arm position when entry occurs, and together the transducers communicate to controller 39 the height and width of the bar stock. As will be appreciated, the bar stock height and width also can be input through input means 62. Thus far, however, nothing has been communicated to control means 39 as to the cross section of the bar stock. In the preferred form controller 39, on the first cut, is programmed to respond to signals from transducers 59, 53, 56 and 51 by assuming that the bar stock has a solid cross section between the vise jaws.

In order to enable efficient cutting of various materials, controller 39 further has data storage means in which the standard, safe, maximum cutting rate for various materials is stored. Industry standards for cutting rates for various types of metals are well known and can be input through input device 62 to a data file in controller 39. Before the first cut starts, input means 62 can be used to identify the material which is being cut. This can be done by a keyboard input at 62 or by a bar code reader input device 62, which reads material bar code on bar stock 36.

Additionally, the type of blade or blade tooth configuration used will affect the material cutting rate. Accordingly, input device 62 can be used to input to controller 54 the identification of saw blade 29. Once the material has been identified, the saw blade identified and the height and width of bar stock 36 input or sensed, the controller is responsive to such input to set the speed of motor 48, through signals through conduit or path 67 and blade force through path 68 to force cylinder 41. Finally, the blade feed rate can be set by the controller through conductor means 69 which controls the hydraulic circuit 42 and feed rate cylinder 43. Default settings for the feed rate, blade force and blade speed are based upon the assumption that bar stock having a rectangular cross section is being cut at about the stored standard, safe, maximum cutting rate for the identified material. It is also possible, however, for the user to input through input device 62 an approximation of the bar stock cross section, as done in Hauser and Sarurai, et al., for the first cut.

Additionally, computer controller 39 sets one of the cutting force and feed rate to be constant throughout the cut. The other of the cutting force and feed rate is allowed to vary in response to cross sectional changes as the saw blade cuts through bar stock 36. Blade speed preferably is kept constant throughout the first cut. In less sophisticated band saws the user may only be able to vary the feed rate or the feed force, so that the selection of which parameter remains constant may be dictated by the saw.

FIG. 2 shows a material distribution profile which is generated during the first cut of band saw 21 when the feed rate is held constant. Curve 71 is a representation of the constant feed rate during cutting from top 72 of the bar stock to bottom 73. Curve 74 is a material distribution profile which is generated by sensing the variation of the blade cutting force.

At top 72, the cutting force is essentially zero and rises rapidly on curve portion 76. As will be seen in FIG. 2, there is a dotted line curve, generally designated 77, which represents the theoretical or approximate material distribution curve for an H-beam being cut while oriented as shown in FIG. 1. In the approximate or theoretical version of the H-beam, the blade would engage top surface 72 across the entire length, which would cause essentially an immediate rise along curve portion 78 to a maximum force level 79. In actuality, blade 29 engages the top right-hand corner of the bar stock upper leg and the length of the cut gradually increases along line 76, not theoretical, vertical dotted line 78.

Once the blade is fully engaged with the top of the bar stock, the maximum cutting force is experienced, along curve portion 81. At break point 82, blade 29 breaks through the lower right-hand corner of the top leg and a reduction in the length engaged by the blade begins to occur on curve portion 83. By contrast, the theoretical curve would stay at a maximum force out to point 84. At break point 86, blade 29 cuts through the left end of the upper leg, but then the force decreases along curve 87, instead of the vertical, theoretical, curve dotted line 88, because the leg is tapered, not a uniform thickness wall. At point 89 the web between the legs is reached, and the slight slope of curve portion 91 is due to the slight angle of the saw arm to the horizon. The theoretical curve portion 92, by contrast, assumes that the web is cut over its full height with the saw blade in a horizontal position. At 93 the bottom leg is engaged, which occurs earlier would be the case for theoretical H-beam shape because of the tapering of the bottom leg. Additionally, the saw blade is now fairly close to horizontal so that the rise in force along curve portion 94 reflects the gradually increasing length which is encountered by the sloping of the two inner tapering surfaces of the bottom leg. At point 96 a maximum force is reached to the end of the cut at 97, at which point the resistance to cutting drops to zero along curve portion 98 at the bottom 73 of the workpiece or bar stock.

It will be apparent by comparing curves 74 and 77, that there are significant differences which would not normally be accounted for by a user input approximation of the shape or cross section of the bar stock, at least for pieces which are more complex than simple geometric cross sections, such as, rectangles and cylinders.

As indicated, the preferred form is to set the force and blade speeds at constants based upon the assumption that the bar stock is rectangular in cross section. It is also possible to input an approximation for the bar stock cross section and to vary one parameter in a know manner, based upon the approximation, and allow the other parameter to vary in response to the actual cross section to generate a material distribution profile which is a deviation profile from the theoretical profile. Thus, at point 84 the feed rate could be increased to level 85 (shown in phantom on the upper curve in FIG. 2) and the cutting force, if the bar stock were exactly an H-beam and exactly cut at a horizontal orientation, would stay up at level 81. Instead, under actual conditions there would be deviations from level 81 which would represent the actual bar stock shape and actual cutting conditions.

It should be noted that by using a shape approximation, instead of a rectangular assumption, the feed rate can be increased and the first cut will be made in less time than will be required if the assumption during the first cut is that the bar stock is a rectangle.

Additionally, the effect of tilting the saw blade through enhancers 37 and 38 is to produce temporary changes in the cross sectional length being engaged by the blade. In the center web between the legs, for example, the changes in force resulting from blade tilting are shown in phantom lines at 99. In some areas the tilting can actually increase the area being cut, for example, at the top of the workpiece where blade tilting would compensate for the angular position of pivot 23. In actual operation, however, it will be apparent that the profile of distribution of the length of the blade engaging the bar stock can be relatively complex and significantly different from a conventional user-input approximation.

In the method of the present invention, therefore, feedback from sensors during a first cut of the bar stock provides a highly accurate material distribution profile which takes into account the geometry of the saw, the actual shape of the workpiece and the presence or absence of cutting enhancement by blade tilting.

In FIG. 3, a material distribution profile 101 is shown which results from using a constant force, as shown by curve 102. Thus, the feed rate at the bottom 103 of the workpiece is at the maximum or free-fall rate 104 and drops along curve portion 106 to a minimum at 107 when the full length of the top leg is being cut. The curve continues as described in connection with the force curve of FIG. 2 until the bottom of the piece is cut through at point 108.

As will be seen, the material profile produced is essentially an inverted image of the FIG. 2 material profile. Again, the effects of actual saw geometry, the workpiece cross section and the operation of an enhancer will all be reflected in the cutting profile.

Once a material distribution profile has been generated by sensing the non-constant operating parameter during the first cut, controller 39 can use the profile to control operation of the band saw during subsequent cuts so as to maintain any desired cutting rate. For example, the controller can set the material cutting rate to be constant over the entire cutting profile at a rate equal to the industry standard for the maximum cutting rate for the particular material being cut. This material cutting rate can be maintained at a constant by, for example, fixing the cutting force and varying the feed rate to produce constant cutting, or vary the cutting force to maintain the desired feed rate for the cross section. As shown in FIG. 2, on the second and subsequent cuts, the force will be increased from top 72 to produce the maximum cutting rate until the saw gets to level 81. The area between lines 76 and 78 is essentially filled, and force is thereafter varied to keep the feed rate at a level producing constant material cutting, e.g., level 81.

Additionally, a constant cutting rate can be achieved by changing the blade speed, and the controller could, of course, vary all three parameters to maintain a constant material cutting rate, notwithstanding the changes in geometry and cross sectional length of the bar stock being engaged at any time during the subsequent cuts. This allows the apparatus and method of the present invention to achieve a very high degree of efficiency during cutting.

It is also important to note that the material profile can be used to achieve non-constant but programmed cutting rates. In longer cross sectional lengths, for example, the chip loading and heating of the blade increases. Thus, the material profile may be used to produce a material cutting rate which decreases below industry standards for longer cross sections and increases above industry standards for shorter cross sections.

It is most preferred that controller 39 respond to the generated material profile to control the operating parameters during subsequent cuts by setting the blade feed force and blade speed at a constant and varying the blade feed rate. This approach allows the controller to safely maintain a constant cutting rate even in the face of blade dulling. Controller 39 sets the blade feed force through cylinder 41 to a level which will be safe for blade 29. As set forth in U.S. Pat. No. 4,901,612, it will not be possible for the cutting force of the blade to exceed the pre-set level established by cylinder 41. Cylinder 41 provides a support force that establishes a maximum net blade cutting force which is safe for the blade. The controller then varies the feed rate through cylinder 43 by comparing the actual feed rate against the material distribution profile generated during the first cut and stored in the controller data storage means. Controller 39 sends control signals through conductor means 69 to control circuit 42 so as to match the feed rate with the previously stored material profile to produce a constant or programmed cutting rate. As the blade dulls, there would be a tendency under a fixed force or load for the feed rate to slow. The controller, however, keeps opening the feed rate orifice in order to maintain the desired feed rate, even though the blade is dulling. This will increase the force on the blade, but it cannot exceed the maximum set by the cylinder 41. Accordingly, when opening the orifice-controlled feed rate no longer is capable of maintaining the programmed feed rate, the controller will know that the blade is so dull that it cannot match the feed rate maximums that are required by the material distribution profile. The controller can be programmed to respond to the occurrence of an inability to keep up with the feed rate required by the distribution profile to signal the operator on display means 64 that the blade is now too dull and should be replaced. It also could be used to shut the saw down, either immediately or after the completion of the current cut.

It also is desirable to use the material identification input to controller 39 as a means for determining whether the cutting force or the feed rate should be held constant during the first cut which generates the material distribution profile. For most materials, it is preferable to hold the force constant and allow the feed rate to vary in order to generate the material distribution profile. This also is the preferred mode of operation during subsequent cuts. Some hard materials tend to work harden if the feed rate is not sufficiently high. Thus, if the forces held constant for materials which work harden, you can get feed rates which are so low as to start to work harden the material. This will make the feed rate decrease further and cause the material distribution profile to be inaccurate. If, however, the feed rate is set at a constant and relatively high rate for the material and cutting force variations are sensed, the feed rate can be maintained so that it will always be sufficiently high to avoid work hardening. This will allow an accurate material distribution profile to be generated for the material.

When subsequent cuts are made, controller 39 can use the generated material distribution profile to determine whether or not feed rates which would produce material hardening will occur. If there is the danger of work hardening, the controller can either operate the saw by varying the cutting blade force or blade speed in the areas in the profile where low feed rates might produce work hardening.

Once the material distribution profile has been generated, controller 39 also can display, through display means 64, various cutting options and enable the operator to override in a pre-programmed cutting mode by the use of input means 62. Information such as the current material cutting rate and the maximum permissible material cutting rate also can be displayed and used to actuate alarms.

Thus, an extremely versatile and very efficient band saw apparatus and method are provided by the present invention in which even relatively unskilled operators can achieve a high degree of cutting efficiency which is essentially matched to industry standards, notwithstanding rather complex bar stock configurations. This is particularly important in production cutting of hard metallic bar stock where a single cut can take thirty minutes, or more.

What is claimed is:

1. A method of cutting of workpieces from bar stock of substantially uniform cross-section with a band saw having a saw blade comprising the steps of:
   sensing selected operating parameters of said band saw during cutting of a first cut of said bar stock, said operating parameters being selected to provide signal representing data sufficient to produce a material distribution profile for said bar stock;
   storing signals representing said data for said material distribution profile in storage means; and
   during cutting of a subsequent cut of said bar stock, employing said signals stored in said storage means to control operation of said band saw.

2. The method as defined in claim 1 wherein, said sensing step is accomplished by sensing blade position during said first cut and simultaneously sensing at least one of blade feed rate and blade cutting force.

3. The method as defined in claim 2 wherein, said sensing step is accomplished by sensing blade feed rate as a function of blade position.

4. The method as defined in claim 2 wherein, said sensing step is accomplished by sensing blade cutting force as a function of blade position.

5. The method as defined in claim 2 wherein, said sensing step is accomplished by sensing blade feed rate and blade cutting force as a function of blade position.

6. The method as defined in claim 5 wherein, said sensing step further includes sensing blade speed as a function of blade position.

7. The method as defined in claim 1 wherein, prior to said storing step, determining a width dimension of said bar stock, and employing said width dimension to generate said profile.

8. The method as defined in claim 7 wherein, said determining step is accomplished by sensing a width dimension of said bar stock.

9. The method as defined in claim 1 wherein,
after said storing step, comparing at least one operating parameter of said band saw indicating a rate of cutting of said bar stock during said subsequent cut with said signals representing said data stored in said storage means; and
during said employing step, controlling operation of said band saw based upon said comparing step.

10. The method as defined in claim 1 wherein,
said employing step is accomplished by controlling at least one of blade feed rate, blade cutting force and blade speed during said subsequent cut.

11. The method as defined in claim 10 wherein,
said employing step is accomplished by adjusting blade feed rate as a function of blade position during said subsequent cut.

12. The method as defined in claim 10 wherein,
said employing step is accomplished by adjusting blade cutting force as a function of blade position during said subsequent cut.

13. The method as defined in claim 10 wherein,
said employing step is accomplished by adjusting blade speed as a function of blade position during said subsequent cut.

14. The method as defined in claim 1, and the steps of:
prior to said first cut, inputting to said storage means input signals identifying the material to said bar stock;
prior to said first cut, sensing a height dimension and a width dimension of said bar stock; and
prior to said first cut, responding to said inputting step and said step of sensing said height dimension and said width dimension to set operating parameters controlling cutting by said band saw to cause cutting of said bar stock during said first cut at about a material cutting rate determined by the identity of said material and said height dimension and said width dimension.

15. The method as defined in claim 14 wherein,
said step of sensing of said height dimension is accomplished by sensing a change in one of blade feed rate and blade cutting force when said blade first enters said bar stock on said first cut.

16. A method as defined in claim 1 wherein,
said employing step is accomplished by controlling operation of said band saw in a manner maintaining a cutting rate of material in said bar stock substantially constant throughout said subsequent cut.

17. The method as defined in claim 1 wherein,
during said first cut, using an approximation of said cross section to control operation of said band saw.

18. A method as defined in claim 16 wherein,
said employing step is accomplished by controlling operation of said band saw by varying a feed rate of said blade while maintaining a cutting rate of said blade and a cutting speed of said blade substantially constant.

19. The method as defined in claim 16 wherein,
said employing step is accomplished by maintaining said cutting rate of said material proximate a material cutting rate standard for said material.

20. The method as defined in claim 16, wherein said first cut is accomplished at a material cutting rate which varies with variations in bar stock cross section.

21. A method of cutting of workpieces with a band saw from a length of bar stock having a substantially uniform cross section along said length, comprising the steps of:
during a first cut of said bar stock by a blade of said band saw, sensing operating parameters of said band saw selected to enable generation of a material distribution profile for said bar stock;
generating a material distribution profile for said bar stock using the sensed operating parameters; and
during a subsequent cut of said bar stock, employing said profile to vary a force applied by said blade to said bar stock during cutting while maintaining a rate of cutting and a speed of said blade substantially constant to cut said bar stock at a substantially constant cutting rate.

22. A method of production cutting of a plurality of workpieces from bar stock having a height dimension, a width dimension and a substantially uniform cross section along a length dimension, said method being accomplished by using a band saw having a movable saw blade and control means coupled to control a blade feed rate and a blade cutting force, said control means further including input means and data storage means; and sensing means coupled to said control means, said sensing means sensing blade position and at least one of blade feed rate and blade cutting force, said method comprising the steps of:
storing a material signal in said data storage means identifying the material to be cut;
storing material size signals in said data storage means indicating said height dimension and said width dimension of said bar stock;
setting said blade feed rate and said blade cutting force on a first cut of said bar stock to produce a material cutting rate determined by a standard for cutting material identified for said bar stock and a rectangular cross section having said height dimension and said width dimension;
during said first cut, sensing at least one of blade feed rate and blade cutting force and simultaneously sensing blade position;
storing sensed signals in said data storage means indicating a material distribution profile for said bar stock based upon said sensing step during said first cut; and
controlling at least one of said blade feed rate and said blade cutting force during a subsequent cut of said bar stock by employing said sensed signals and said material signal to produce cutting of said bar stock at a substantially constant material cutting rate throughout said subsequent cut.

23. The method as defined in claim 22 wherein,
said one of said blade feed rate and said blade cutting force are controlled to produce a constant material cutting rate during said subsequent cut which is about equal to an industry standard for said material.

24. In a band saw having a movable cutting blade assembly, control means coupled to control at least one of blade feed rate and blade cutting force and having data storage means, sensing means producing sensing signals as to blade position and at least one of blade feed rate and blade cutting force, and input means coupled to said control means for the input of input signals to said storage means, the improvement in said band saw comprising:

said control means being responsive to said sensing
signals and stored input signals during a first cut of
a length of bar stock having a substantially uniform
cross section along said length to store a material
distribution profile for said bar stock in said data
storage means, and said control means further being responsive to said
sensing signals during a second cut of said bar stock
to compare said sensing signals to said profile in
said storage means and to control at least one of
blade feed rate and blade cutting force to produce
a substantially constant material cutting rate during
said second cut.

25. The band saw as defined in claim 24, wherein,
said input means includes sensing means for sensing a
width dimension and a height dimension of said bar
stock.

26. The band saw as defined in claim 24 wherein,
said input means includes means for inputting a material identifying input signal to said control means.

27. The band saw as defined in claim 24 wherein,
said input means includes sensing means generating a
width dimension input signal for said bar stock, and
means for user input of a material identifying input
signal.

28. The band saw as defined in claim 24 wherein,
said control means is responsive to said input signals
and said sensing signals to vary blade feed rate to
produce said substantially constant material cutting
rate.

29. The band saw as defined in claim 24 wherein,
said storage means includes stored industry standards
data for material cutting rates; and said control means is responsive to said input signals,
said sensed signals, said profile and said stored
industry standards data to control at least one of
blade feed rate and blade cutting force to produce
a substantially constant material cutting rate about
equal to a stored industry standard for the material
being cut.

30. In a band saw having a movable cutting blade
assembly, control means coupled to control at least one
of blade feed rate, and blade cutting force and having
data storage means, sensing means producing sensing
signals as to blade position and at least one of blade feed
rate and blade cutting force, and input means coupled to
said control means for input by one of an operator and
said sensing means of input signals to said control
means, the improvement in said band saw comprising:

said control means being responsive to said sensing
signals and said input signals during a first cut of a
length of bar stock having a substantially uniform
cross section to generate a material distribution
profile for said bar stock and to store said profile in
said data storage means, and said control means further being responsive to said
sensing signals during a second cut of said bar stock
to compare said sensing signals to said profile in
said storage means and to vary said blade cutting
force to produce a substantially constant material
cutting rate during said second cut.

* * * * *